United States Patent
Kang

(10) Patent No.: US 11,302,282 B2
(45) Date of Patent: Apr. 12, 2022

(54) DISPLAY APPARATUS AND THE CONTROL METHOD THEREOF

(71) Applicant: SAMSUNG ELECTRONICS CO., LTD., Suwon-si (KR)

(72) Inventor: Kunsok Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/913,763

(22) Filed: Jun. 26, 2020

(65) Prior Publication Data

US 2020/0410954 A1 Dec. 31, 2020

Related U.S. Application Data

(60) Provisional application No. 62/866,701, filed on Jun. 26, 2019.

(30) Foreign Application Priority Data

Jan. 2, 2020 (KR) ........................ 10-2020-0000378

(51) Int. Cl.
*G06F 3/0485* (2013.01)
*G09G 5/00* (2006.01)
(Continued)

(52) U.S. Cl.
CPC ........... *G09G 5/006* (2013.01); *G06F 3/0485* (2013.01); *G06F 9/451* (2018.02); *G06F 9/543* (2013.01);
(Continued)

(58) Field of Classification Search
CPC .... G09G 5/006; G09G 2370/12; G06F 9/451; G06F 3/1431; G06F 3/0842; G06F 3/0485; H04N 21/43635
See application file for complete search history.

(56) References Cited

U.S. PATENT DOCUMENTS

| 9,942,594 B2 | 4/2018 | Wilson et al. |
| 10,275,370 B2 | 4/2019 | Perez et al. |

(Continued)

FOREIGN PATENT DOCUMENTS

| JP | 5866027 B2 | 2/2016 |
| KR | 101283324 B1 | 7/2013 |

(Continued)

OTHER PUBLICATIONS

International Search Report (PCT/ISA/210), dated Oct. 13, 2020 by the International Searching Authority in International Application No. PCT/KR2020/008143.

(Continued)

*Primary Examiner* — Robert J Michaud
(74) *Attorney, Agent, or Firm* — Sughrue Mion, PLLC

(57) ABSTRACT

A display apparatus, including a display; an interface configured to couple with a dongle, wherein the dongle and the display apparatus are configured to use different operating systems; a user input device; and at least one processor configured to, based on receiving a first execution image of an application from the dongle, display the first execution image on an area of the display, based on receiving a user operation at a point within the area, convert first coordinate information representing a location of the point relative to the display into second coordinate information representing the location of the point relative to the area, and transmit the second coordinate information to the dongle, and based on receiving a second execution image of the application from the dongle, display the second execution image, wherein the second execution image is generated by the dongle based on the second coordinate information.

18 Claims, 12 Drawing Sheets

(51) Int. Cl.
*G06F 9/54* (2006.01)
*G06F 9/451* (2018.01)
*H04N 21/4363* (2011.01)

(52) U.S. Cl.
CPC ... *H04N 21/43635* (2013.01); *G09G 2370/12* (2013.01)

(56) References Cited

U.S. PATENT DOCUMENTS

| | | | |
|---|---|---|---|
| 10,326,822 B2 | 6/2019 | Reichling | |
| 10,356,142 B1 | 7/2019 | Rajagopalan et al. | |
| 10,380,050 B2 | 8/2019 | Kim | |
| 10,810,285 B2 | 10/2020 | Wilson et al. | |
| 2015/0067549 A1* | 3/2015 | Chang | G06F 3/0484 715/761 |
| 2015/0205396 A1 | 7/2015 | Konishi et al. | |
| 2016/0139692 A1 | 5/2016 | Glazer et al. | |
| 2016/0196220 A1* | 7/2016 | Perez | G06F 21/44 710/73 |
| 2018/0143927 A1 | 5/2018 | Kim et al. | |
| 2019/0042338 A1 | 2/2019 | Ahn et al. | |

FOREIGN PATENT DOCUMENTS

| | | | |
|---|---|---|---|
| KR | 10-2015-0074446 A | | 7/2015 |
| KR | 101582795 B1 | | 1/2016 |
| KR | 1020160083764 A | | 7/2016 |
| KR | 10-2017-0092470 A | | 8/2017 |
| KR | 1020170101972 A | | 9/2017 |
| KR | 10-2018-0041961 A | | 4/2018 |
| KR | 20180041961 A | * | 4/2018 |
| KR | 10-2018-0058089 A | | 5/2018 |
| KR | 1020190069877 A | | 6/2019 |

OTHER PUBLICATIONS

Written Opinion (PCT/ISA/237) dated Oct. 13, 2020by the International Searching Authority in International Application No. PCT/KR2020/008143.

* cited by examiner

DISPLAY APPARATUS AND THE CONTROL METHOD THEREOF

CROSS-REFERENCE TO RELATED APPLICATION(S)

This application is based on and claims priority under 35 U.S.C. § 119 to Korean Patent Application No. 10-2020-0000378, filed on Jan. 2, 2020, in the Korean Intellectual Property Office, and U.S. Provisional Application No. 62/866,701, filed on Jun. 26, 2019, in the United States Patent and Trademark Office, the disclosures of which are incorporated by reference herein in their entirety.

BACKGROUND

1. Field

The disclosure relates to a display apparatus and a control method for controlling the display apparatus, and more particularly, to a display apparatus for executing various applications and a control method for controlling the display apparatus.

2. Description of the Related Art

A display apparatus such as a television (TV), or the like, may execute various applications based on an operating system (OS) installed in the display apparatus, and provide various services such as web surfing, games, e-commerce services, streaming services, video-on-demand (VOD) services, social network services, or the like.

However, the display apparatus may not be capable of providing a service provided by an application based on an OS other than the OS of the display apparatus.

As a result, a user may be unable to enjoy diverse services through various applications based on various operating systems.

SUMMARY

Provided is a display apparatus capable of executing various applications, and of connecting to a dongle capable of executing various applications.

Additional aspects will be set forth in part in the description which follows and, in part, will be apparent from the description, or may be learned by practice of the presented embodiments.

In accordance with an aspect of the disclosure, a display apparatus includes a display; an interface configured to couple with a dongle in which first operating system (OS) is installed, the first OS being different from a second OS installed in the display apparatus; a user input device; and at least one processor configured to, based on receiving a first execution image of a first application based on the first OS from the dongle through the interface, display the received first execution image on a first area of the display, based on receiving a user operation at a point within the first area through the user input device, convert first coordinate information representing a location of the point relative to the display into second coordinate information representing the location of the point relative to the first area, and transmit the second coordinate information to the dongle through the interface, and based on receiving a second execution image of the first application from the dongle through the interface, display the second execution image on the display, wherein the second execution image is generated by the dongle based on the second coordinate information.

The user operation may include at least one from among a selection operation of a control user interface (UI) element included in the first execution image, and a scrolling operation of the control UI element.

The at least one processor may be further configured to convert the first coordinate information into the second coordinate information based on third coordinate information representing a location of the first area relative to the display.

The at least one processor may be further configured to transmit the second coordinate information and size information of the first area to the dongle through the interface, and the dongle may be further configured to identify the user operation with respect to the first application based on the size information of the first area and the second coordinate information.

The user input device may include a coordinate-based input device.

The interface may include a high definition multimedia interface (HDMI), and the at least one processor may be further configured to transmit the second coordinate information to the dongle through a consumer electronics control (CEC) link of the HDMI.

The at least one processor may be further configured to display a third execution image of a second application based on the second OS on a second area different from the first area while the first execution image is displayed on the first area.

The at least one processor may be further configured to, based on information about the first application being received through the interface, display a first graphical user interface (GUI) representing the first application on the display together with a second GUI representing a second application based on the second OS, based on receiving a user operation for selecting the first GUI through the user input device, transmit a signal requesting an execution of the first application to the dongle through the interface, and based on the first execution image being received through the interface as the dongle executes the first application according to the signal, display the received first execution image on the first area of the display.

In accordance with an aspect of the disclosure, a control method of a display apparatus in which a second operating system (OS) is installed includes receiving, from a dongle in which a first OS is installed, a first execution image of a first application based on the first OS, the first OS being different from the second OS installed in the display apparatus; displaying the received first execution image on a first area of a display of the display apparatus; based on receiving a user operation at a point within the first area, converting first coordinate information representing a location of the point relative to the display into second coordinate information representing the location of the point relative to the first area; transmitting the second coordinate information to the dongle; and based on receiving a second execution image of the first application from the dongle, displaying the second execution image on the display, wherein the second execution image is generated by the dongle based on the second coordinate information.

The user operation may include at least one from among a selection operation of a control user interface (UI), and a scrolling operation of the control UI element.

The first coordinate information may be converted into the second coordinate information based on third coordinate information representing a location of the first area relative to the display.

The method may further include transmitting the second coordinate information and size information of the first area to the dongle, and the dongle may be configured to identify the user operation with respect to the first application based on the size information of the first area and the second coordinate information.

The display apparatus may include a coordinate-based input device, and the user operation may be input through the coordinate-based input device.

The display apparatus may be coupled to the dongle through a high definition multimedia interface (HDMI) terminal, and the second coordinate information may be transmitted to the dongle through a consumer electronics control (CEC) link of the HDMI.

The method may further include displaying a third execution image of a second application based on the second OS on a second area different from the first area while the first execution image is displayed on the first area.

The method may further include receiving information about the first application; displaying a first graphical user interface (GUI) representing the first application together with a second GUI representing a second application based on the second OS; based on receiving a user operation for selecting the first GUI, transmitting a signal requesting an execution of the first application to the dongle; and receiving the first execution image from the dongle as the dongle executes the first application according to the signal.

In accordance with an aspect of the disclosure, a control method of a display apparatus includes receiving, from a dongle in which a first operating system (OS) is installed, an execution image of an application based on the first OS, the first OS being different from a second OS installed on the display apparatus; displaying the received first execution image on a first area of a display of the display apparatus; based on receiving a user command corresponding to a point within the first area, converting first coordinate information of the point in a first coordinate system corresponding to the display into second coordinate information of the point in a second coordinate system corresponding to the first area; transmitting the second coordinate information to the dongle; receiving a second execution image generated by the dongle based on the user command and the second coordinate information; and displaying the second execution image on the display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
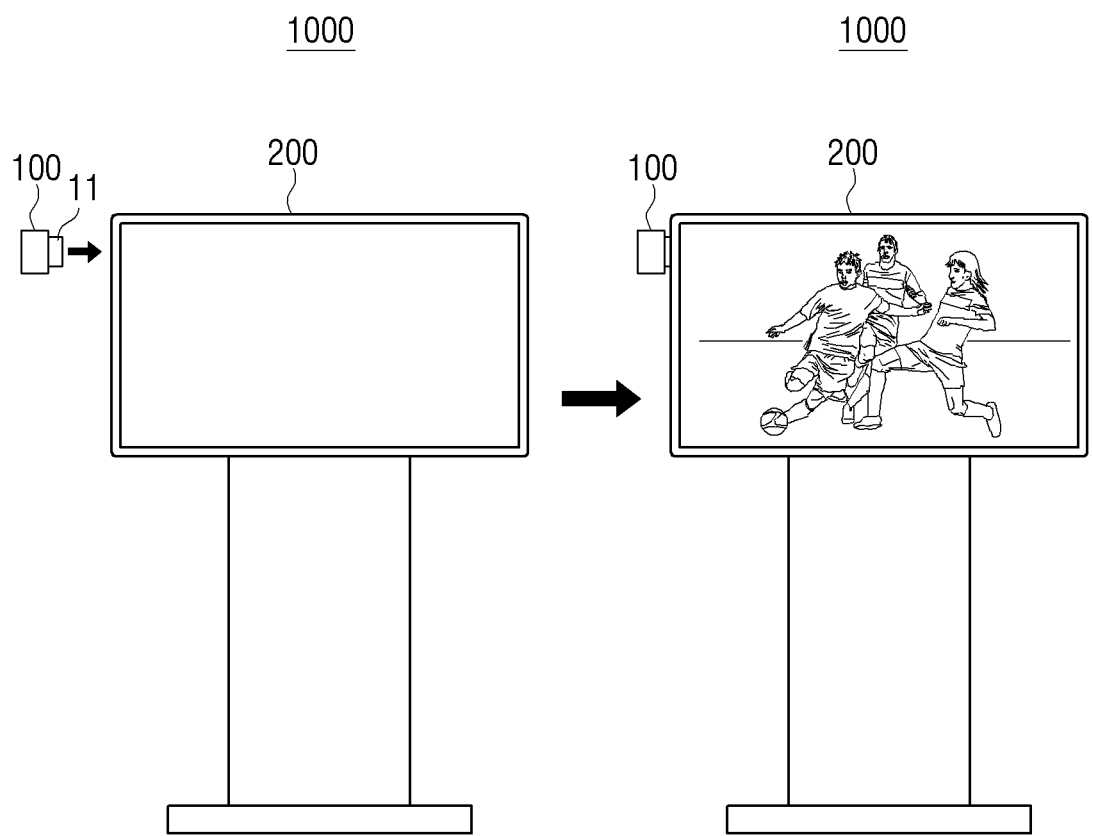
FIG. 1A is a view illustrating a display system according to an embodiment.

The above and other aspects, features, and advantages of embodiments will be more apparent from the following description taken in conjunction with the accompanying drawings, in which: However, it should be understood that the disclosure is not limited to the specific embodiments described hereinafter, but includes various modifications, equivalents, and/or alternatives of the embodiments. In relation to explanation of the drawings, similar drawing reference numerals may be used for similar elements.

In this description, expressions such as "have," "can have," "includes," or "can contain," indicate the existence of a corresponding feature (e.g., a component such as a numerical value, function, operation, or part) and does not exclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and is only intended to distinguish one element from another, without limiting the corresponding elements.

When an element (e.g., a first element) is described as being "operatively or communicatively coupled with/to" or "connected to" another element (e.g., a second element), the element may be directly coupled with another element or may be coupled through the other element (e.g., a third element). When an element (e.g., a first element) is described as being "directly coupled with/to" or "directly connected to" another element (e.g., a second element), an element may not exist between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, "a processor configured (or configured to) perform A, B, and C" may refer to a dedicated processor (e.g., an embedded processor) for performing corresponding operations, or a generic-purpose processor (e.g., central processing unit (CPU) or an application processor) capable of performing corresponding operations by executing one or more software programs stored in a memory device.

An object of the disclosure is to provide a display apparatus capable of providing more diverse services through various applications based on various OS and a control method thereof.

In addition, another object of the disclosure is to provide a display apparatus capable of accurately controlling the other OS-based application and a control method thereof when an application based on another OS different from the OS installed on the display apparatus is displayed on the display apparats.

Hereinafter, embodiments will now be explained in detail with reference to the accompanying drawings.

FIGS. 1A, 1B, 1C, and 1D are views illustrating a display system according to embodiments.

Figure 1B:
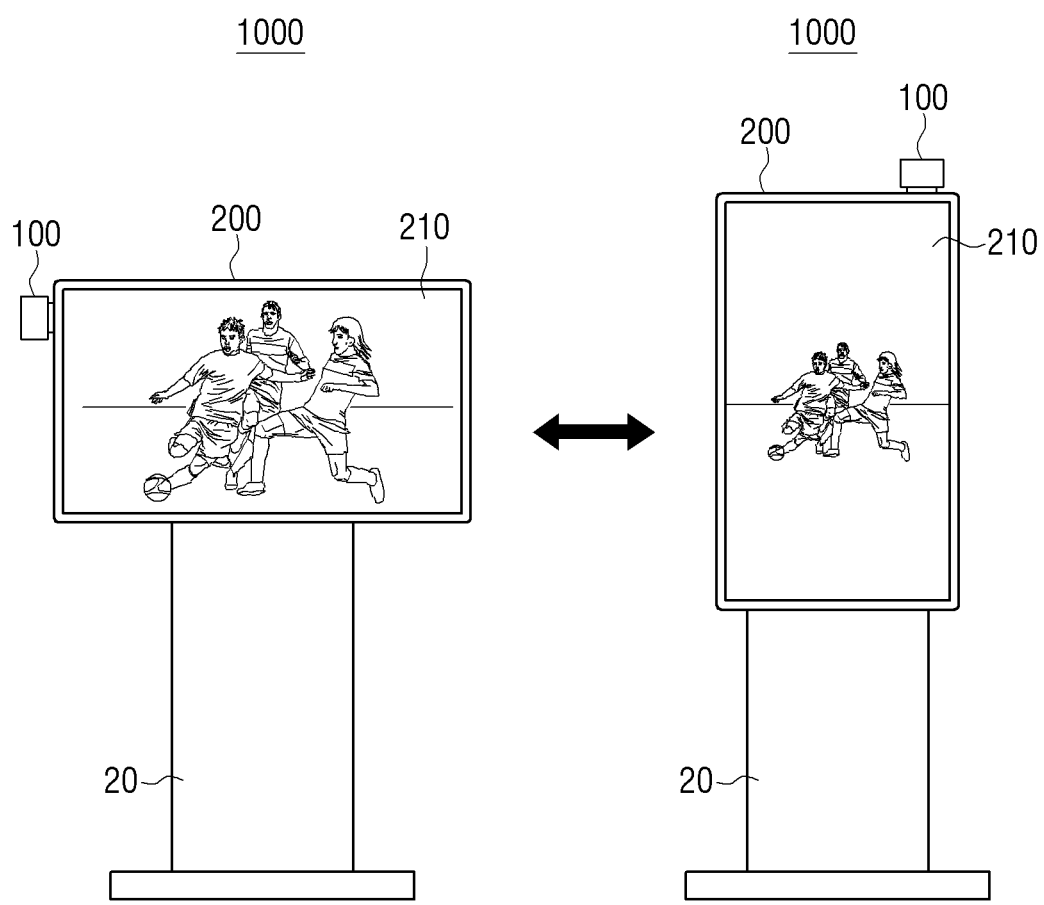
FIG. 1B is a view illustrating a display system according to an embodiment.

Referring to FIGS. 1A and 1B, the display system 1000 according to embodiments may include a dongle 100 and a display apparatus 200.

As illustrated in FIG. 1A, the dongle 100 may be coupled to the display apparatus 200. For example, a high definition multimedia interface (HDMI) connector 11 provided in the dongle 100 may be coupled to an HDMI port provided in the display apparatus 200.

Accordingly, the display apparatus 200 and the dongle 100 may perform communication through an HDMI communication method.

The display apparatus 200 may be implemented as a television (TV). As illustrated in FIG. 1B, the display apparatus 200 may be a TV configured to rotate a display 210 attached to a stand 20. In other words, the display 210 may be rotated from a horizontal direction to a vertical direction, or may be rotated from the vertical direction to the horizontal direction. Accordingly, the display apparatus 200 may include a motor for rotating the display 210.

Accordingly, the display apparatus 200 may display various images using the display 210 arranged in the horizontal direction and the vertical direction.

Figure 1C:
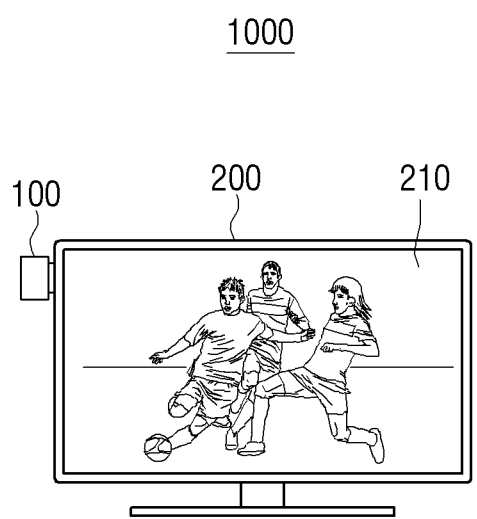
FIG. 1C is a view illustrating a display system according to an embodiment.

However, this is merely an example, and the display apparatus 200 may be implemented as a TV or the like, in which the display does not rotate, as illustrated in FIG. 1C.

In embodiments, the display apparatus 200 may display various images and a user interface screen on the display 210 by using an operating system (OS) of the display apparatus 200 that is mounted, stored, or installed on the display apparatus 200. The OS of the display apparatus 200 may be an OS used in a TV, such as Tizen or the like, but embodiments not limited thereto.

For example, the display apparatus 200 may display a home screen provided by the OS on the display 210. The home screen may include a graphical user interface (GUI) for selecting an input source of the display apparatus 200, and a GUI representing an application stored or installed in the display apparatus 200.

Also, the display apparatus 200 may perform various operations based on a user command input through the home screen.

For example, when a user command for selecting a GUI representing an input source corresponding to a set-top box is input, the display apparatus 200 may display an image received from the set-top box on the display 210, and output audio received from the set-top box through a speaker of the display apparatus 200.

In another example, when a user command selected by a GUI representing an application for providing an image service is input through the GUI, the display apparatus 200 may execute the selected application to connect to a server that provides a service through corresponding application, and display the image received from the server on the display 210.

As such, the display apparatus 200 may receive images from various external sources and display the received images on the display 210.

In particular, according to an embodiment, the display apparatus 200 may receive an image from the dongle 100 coupled to the display apparatus 200 and display the received image on the display 210.

The dongle 100 may execute an application stored in the dongle 100 using the OS of the dongle 100 mounted, stored, or installed on the dongle 100, and transmit the image provided by the application to the display apparatus 200.

In addition, the dongle 100 may perform an operation of the application according to a user operation with respect to the application of the dongle 100 displayed on the display apparatus 200, and transmit the image of the application in which the operation corresponding to the user operation is performed to the display apparatus 200.

The dongle 100 may be implemented as one device without a display and may be directly coupled to the display apparatus 200, but embodiments are not limited thereto. According to an embodiment, the dongle 100 may include a display or may be coupled to an HDMI port of the display apparatus 200 through a separate adapter.

For example, as described above, the dongle 100 may include an OS different from the OS of the display apparatus 200 and may be coupled to the display apparatus 200 through the HDMI communication method. Accordingly, the dongle 100 may connect a portable terminal device (e.g., a smartphone) including the OS different from the display apparatus 200 to the HDMI port of the display apparatus 200, and configure the foregoing display system 1000.

In an embodiment, a portable terminal device such as a smartphone, etc., may have a universal serial bus (USB) port, and may not have the HDMI port. Accordingly, the portable terminal device may connect to the HDMI port of the display apparatus 200 through an adapter having both a USB connector and an HDMI connector, and configure the foregoing display system 1000. The adapter may be in the form of a cable or a cradle, but embodiments are not limited thereto.

Figure 1D:
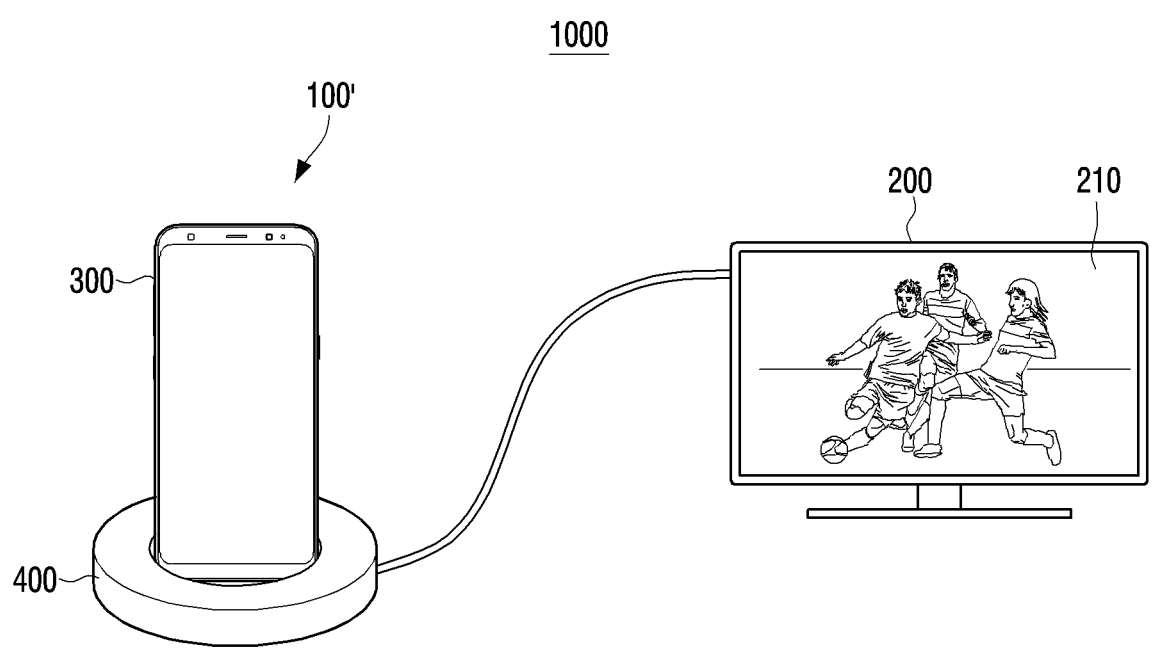
FIG. 1D is a view illustrating a display system according to an embodiment.

FIG. 1D illustrates an example in which a smartphone 300 is coupled to a display apparatus 200, for example a TV, through a cradle type adapter, for example cradle 400.

In embodiments, the cradle 400 may include a USB connector coupled to a USB port of the smartphone 300 and an HDMI connector coupled to the HDMI port of the display apparatus 200.

Accordingly, the smartphone 300 including an OS different from the OS of the display apparatus 200 may communicate with the display apparatus 200 through an HDMI communication method through the cradle 400. The cradle 400 and the smartphone 300 coupled to each other through the USB interface may act as a dongle 100', and may perform the same function as the dongle 100 mentioned in various embodiments.

Figure 2:
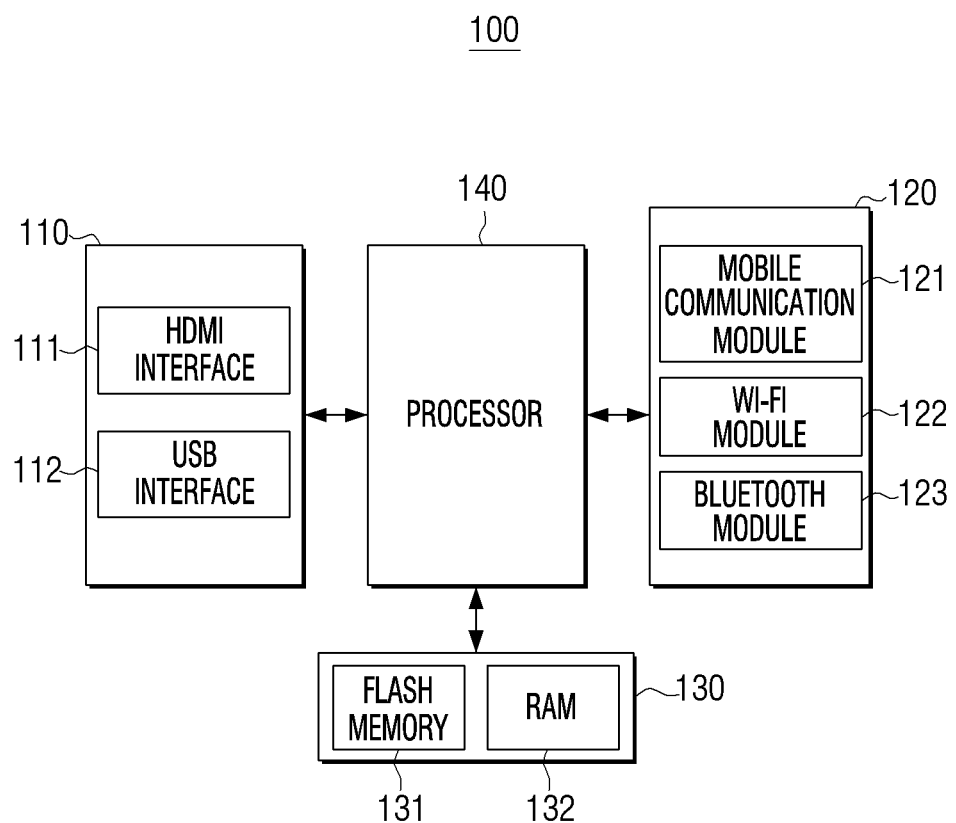
FIG. 2 is a block diagram illustrating a dongle according to an embodiment.

FIG. 2 is a block diagram of the dongle 100 according to an embodiment. As illustrated in FIG. 2, the dongle 100 may include an interface 110, a communicator 120, a memory 130, and a processor 140.

The interface 110 may be a component for communicatively connecting between the dongle 100 and the display apparatus 200. The interface 110 may be connected to the display apparatus 200 using various communication methods such as HDMI, universal serial bus (USB), or the like.

Accordingly, the interface 110 may include an HDMI interface 111 that includes an HDMI connector or HDMI port for HDMI communication, and a USB interface 112 that includes a USB connector or USB port for USB 2.0 and/or USB 3.0 communication. The interface 110 may be directly coupled to the display apparatus 200, or may be coupled to the display apparatus 200 through a separate cable.

The communicator 120 may communicate with an external device. The communicator 120 may perform communication with the external device using various communication methods such as mobile communication, Wi-Fi, Bluetooth, or the like.

Accordingly, the communicator 120 may include a mobile communication module 121 for mobile communication such as 3rd generation (3G), 3rd generation partnership project (3GPP), long term evolution (LTE), 5th generation (5G), or the like, a Wi-Fi module 122 for Wi-Fi communication, and a Bluetooth module 123 for Bluetooth communication.

The mobile communication module 121 may connect to the Internet through a mobile communication network to perform communication with a server, and the Wi-Fi module 122 may be coupled to an access point and connect to the Internet through the access point to perform communication with various servers. In addition, the Bluetooth module 123 may communicate with various devices located around the dongle 100.

The memory 130 may store various instructions and software programs related to an operation of the dongle 100. To achieve this, the memory 130 may include a flash memory 131 and a RAM 132.

The processor 140 may control the overall operation of the dongle 100. In other words, the processor 140 may be electrically coupled to the interface 110, the communicator 120, and the memory 130 to control these components.

The processor 140 may include a central processing unit (CPU) or an application processor (AP), and may execute one or more software programs stored in the memory 130 according to one or more instructions.

For example, when power is applied to the dongle 100, the processor 140 may drive the OS stored in the flash memory 131 using the RAM 132. The OS may be an OS used in a portable device such as a smartphone or tablet, such as Android, iOS or the like.

The power applied to the dongle 100 may be provided from the display apparatus 200 coupled to the dongle 100 through the USB interface 112. However, according to an embodiment, the dongle 100 may have a separate battery.

In addition, the processor 140 may load and execute an application stored in the flash memory 131 using the RAM 132 through the OS.

The application may be an application program executed based on the OS. For example, when the OS installed on the dongle 100 is Android, the application may be an application program that may be executed on Android. In addition, when the OS installed in the dongle 100 is iOS, the application may be an application program that may be executed in the iOS.

The application may be stored in the memory 130 at a time of manufacturing the dongle 100, or may be downloaded from a server (e.g., a play store, etc.) providing an application according to a user command and stored in the memory 130.

In embodiments, a command for executing the application stored in the dongle 100 may be received from the display apparatus 200.

Specifically, the processor 140 may transmit information related to the application stored in the memory 130 to the display apparatus 200 coupled through the interface 110. The information about the application may include information for identifying an application, such as the name of the application.

The display apparatus 200 may display a GUI representing the application stored in the dongle 100 on the display 210 using information about the application received from the dongle 100. For example, the display apparatus 200 may display a home screen including the GUI representing the application stored in the dongle 100 on the display 210.

Then, when the GUI representing the application stored in the dongle 100 is selected, the display apparatus 200 may transmit a command requesting execution of an application corresponding to the selected GUI to the dongle 100.

Accordingly, when the command requesting execution of the application is received through the interface 110, the processor 140 may execute the corresponding application according to the received request and transmit an execution screen to the display apparatus 200.

In addition, the processor 140 may connect to a server that provides an application-related service through a mobile communication module 121 and/or a Wi-Fi module 122, and transmit an application-related image received from the server to the display apparatus 200.

Accordingly, the display apparatus 200 may display the image received from the dongle 100 on the display 210. The display apparatus 200 may display the image received from the dongle 100 on one area of the display 210, but embodiments are not limited thereto.

According to an embodiment, user command or user operations with respect to the application of the dongle 100 displayed on the display apparatus 200 may be received through a user input unit, which may be for example a user input device or user input interface provided in the display apparatus 200.

For example, when the display apparatus 200 is provided with a touch screen, and when a user operation with respect to the application of the dongle 100 displayed on the display apparatus 200 is input through the touch screen, the display apparatus 200 may transmit coordinate information about a point where the user operation is input and size information of an area in which the application of the dongle 100 is displayed on the display 210 to the dongle 100 through the interface 110.

The display apparatus 200 may transmit the coordinate information and the size information of the area to the dongle 100 through an HDMI-consumer electronics control (CEC) port, but embodiments are not limited thereto.

In embodiments, the display apparatus 200, as will be described below, may convert coordinate information with respect to the point where the user operation is input based on the display 210 into coordinate information based on one area of the display 210 on which the application is displayed, and transmit it to the dongle 100.

Accordingly, the processor 140 may identify an operation corresponding to the user operation based on the coordinate information on which the user operation is input and the size information of the area where the application is displayed, received from the display apparatus 200, and perform the identified operation with respect to the application. In addition, the processor 140 may transmit an execution image of the application in which the operation corresponding to the user operation is performed to the display apparatus 200 through the interface 110.

For example, when the user operation is a selection operation of a control UI element included in the application displayed on the display 210, the processor 140 may identify that a point where the user operation is input is an area where the control UI element is located in the application, for example in an execution image of the application. Accordingly, the processor 140 may identify that the user operation is a selection operation of the control UI element included in the application.

Accordingly, the processor 140 may perform a control operation corresponding to a selected control UI element for the application. For example, when the application of the dongle 100 displayed on the display 210 is a multimedia player and when the selected control UI element is a UI element corresponding to "pause", the processor 140 may stop playing or otherwise pause the playback of a content being played in the multimedia player and transmit the image in which the content is paused to the display apparatus 200 through the interface 110.

In the description above, it has been described that the control UI element corresponds to a "pause" user operation, but embodiments are not limited thereto. In other words, the control UI element for controlling the operation of the corresponding application according to the user selection may exist in each application in various ways, and there may be various control UI elements in one application.

When the user operation is a scroll operation with respect to the application displayed on the display 210, the processor 140 may identify that change of the coordinate has continuously occurred in a certain length in the application based on the coordinate information and the size information of the area received from the display apparatus 200. Accordingly, the processor 140 may determine that the user operation is a scrolling operation.

Accordingly, the processor 140 may perform the scrolling operation on the application, and transmit an image of the scrolled application according to a user operation to the display apparatus 200 through the interface 110.

In the description above, it has been described that the user input unit of the display apparatus 200 is a touch screen, but embodiments are not limited thereto, and various input devices based on coordinates may be provided in the display apparatus 200, and the user may input various user operations and control the operation of the application of the dongle 100.

In embodiments, a user operation with respect to the application of the dongle 100 displayed on the display apparatus 200 may be input through a device coupled to the dongle 100.

Specifically, the processor 140 may control the Bluetooth module 123 to perform communication connection with the corresponding device by searching for a peripheral device of the dongle 100 and paring with the searched device.

Then, when the device is connected through the Bluetooth module 123, the processor 140 may receive the user operation input to the device from the device, perform an operation according to the received user operation, and transmit an execution image of the application in which an operation corresponding to the user operation is performed to the display apparatus 200 through the interface 110. The display apparatus 200 may display the image received from the dongle 100 on the display 210.

Accordingly, the user may control the application executed in the dongle 100 by connecting an input device such as a remote control, a keyboard, a mouse, a game controller, or the like to the dongle 100.

As described above, according to an embodiment, the display apparatus 200 may display an execution screen of an application executed in the dongle 100 operating based on an OS different from the display apparatus 200 in addition to the application stored in the display apparatus 200. Also, the display apparatus 200 may accurately control an operation of the application of the dongle 100 through a user input unit provided in the display apparatus 200 or a device coupled to the dongle 100.

Accordingly, the user may receive and use various OS-based applications through the display apparatus 200.

Figure 3:
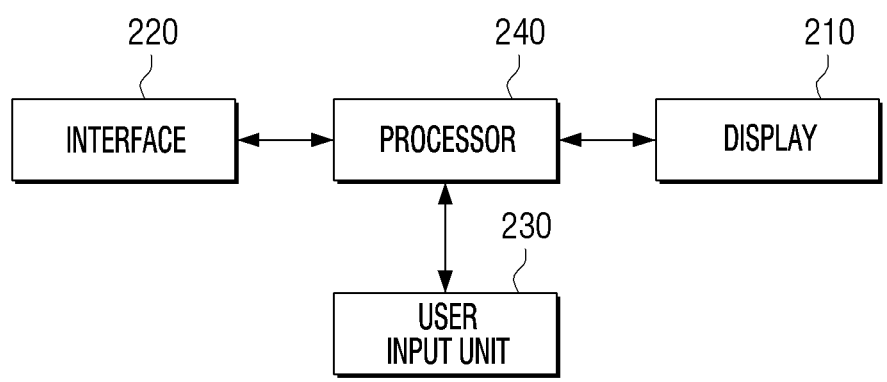
FIG. 3 is a block diagram illustrating a display apparatus according to an embodiment.

FIG. 3 is a block diagram of a display apparatus according to an embodiment.

Referring to FIG. 3, the display apparatus 200 may include an interface 220, the display 210, a user input unit 230, and a processor 240.

The interface 220, which may be for example a dongle interface, may be coupled to the dongle 100 and transmit and receive various data with the dongle 100. The dongle 100 may include an OS different from the OS included on the display apparatus 200.

The interface 220 may be coupled to the dongle 100 using various communication methods such as HDMI and USB.

Accordingly, the interface 220 may include an HDMI interface including an HDMI connector or HDMI port for HDMI communication, a USB interface including a USB connector or USB port for USB 2.0 and/or USB 3.0 communication. The interface 220 may be directly coupled to the dongle 100, or may be coupled to the display apparatus through a separate cable.

For example, the display apparatus 200 may receive, through the HDMI interface, an execution image of an OS-based application included on the dongle 100, information related to an application including identification information for identifying an application, such as an application name, a serial number, or the like.

In addition, the display apparatus 200 may transmit coordinate information on a point where a user operation is input, size information on an area of the display 210 where the application of the dongle 100 is displayed, and various signals for controlling the operation of the dongle 100, such as a signal requesting an application execution of the dongle 100, or the like to the dongle 100 through an HDMI-CEC link.

Further, the display apparatus 200 may supply power to the dongle through the USB interface.

The display 210 may display various images. The image displayed on the display 210 may include a still image, a video, a UI, a GUI, an icon, or the like.

For example, the display 210 may display, on an area of the display 210, an execution image of the application received from the dongle 100 through the interface 220 according to the control of the processor 240. In addition, the display 210 may display a GUI representing an application of the dongle 100 and a GUI representing an application of the display apparatus 200, separately or together.

Also, the display 210 may display the execution image of the application received from the dongle 100 and the execution image of the application of the display apparatus 200, separately or together.

For this operation, the display 210 may be realized as various kinds of displays, such as liquid crystal display (LCD), organic light-emitting diode (OLED), liquid crystal on silicon (LCoS), digital light processing (DLP), inorganic light-emitting diode (LED), micro LED, or the like.

A user input unit 230, which may be referred to as a user input device or a user input interface, may be configured to receive user operation with respect to the display apparatus 200. In particular, the user input unit 230 may include a coordinate-based input device.

The coordinate-based input device may include one or more of various devices that can process the user operation by converting the user operation to the coordinate on the display 210, and may include a touch panel, a mouse, a pointing device, a touch screen, which may be for example a combination of the touch panel and the display 210, three-dimensional (3D) depth camera, or the like, but embodiments are not limited thereto.

Accordingly, the user may control the operation of the application by operating, through the user input unit 230, various UIs or GUIs included in the execution image of the application displayed on the display 210. Also, the user may scroll or drag the execution image of the application through the user input unit 230.

In addition, the user input unit 230 may include various buttons, keypads, or the like.

The processor 240 may control the overall operation of the display apparatus 200. Accordingly, the processor 240 may include at least one of a central processing unit (CPU), an application processor (AP), or a communication processor (CP).

When the power is applied to the display apparatus 200, the processor 240 may drive a stored OS, load various programs based on the OS from a memory according to the user operation, and execute the programs. The OS may be an OS used in a TV, such as Tizen, or the like, and may be different from an OS used in a portable device such as Android or iOS.

Hereinafter, an example of an operation of the processor 240 according to various embodiments will be described in detail with reference to FIGS. 4 to 7 for convenience of description.

For example, when the execution image of the application is received from the dongle 100 through the interface 220, the processor 240 may display the received execution image on an area of the display 210.

The area of the display 210 on which the application of the dongle 100 is displayed may be an area of a size and location determined by default, but embodiments are not limited thereto. For example, the area may be allocated to an appropriate size at an appropriate location based on the size of the display 210 and size information of the application. The size information of the application may be obtained from the dongle 100 through the interface 220 or may be obtained from a server that manages an application through a communication unit. According to an embodiment, the size and location of the area may be set by the user.

In addition, while the application of the dongle 100 is being displayed in the area, when a user operation of the application is input through the user input unit 230 in the area, the processor 240 may convert the coordinate information about a point where the user operation is received on the display 210 into coordinate information based on the area.

Figure 4:
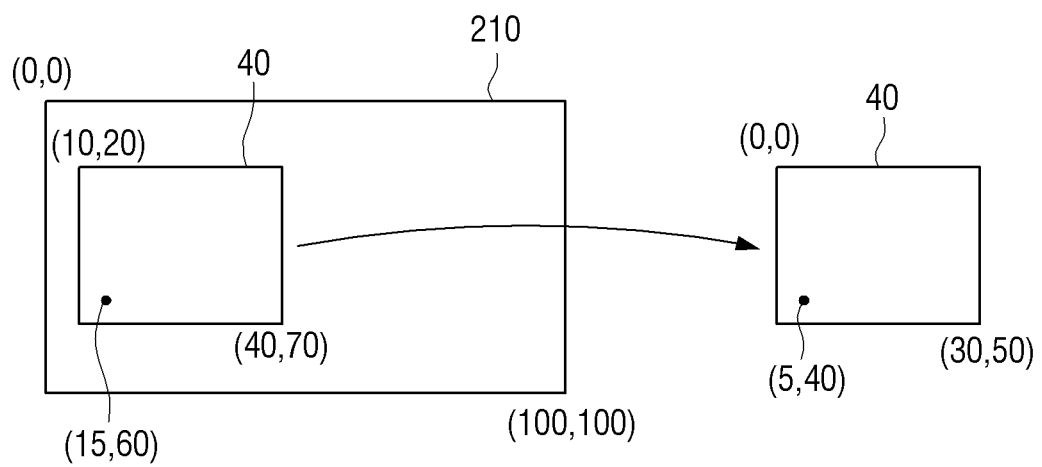
FIG. 4 is a view illustrating a coordinate transformation according to an embodiment.

FIG. 4 is a view illustrating a coordinate conversion according to an embodiment. Referring to the left drawing of FIG. 4, an application execution image of the dongle 100 may be displayed on an area 40 of the display 210.

Specifically, the display 210 may have (0, 0) to (100, 100) coordinates, and the execution image of the application may be displayed on an area bounded by coordinates (10, 20) to (40, 70) of the area 40.

As for an application displayed in the area 40, when a user operation is input to point (15, 60) based on the coordinate of the display 210, the processor 240 may convert coordinate information (15, 60) corresponding to the point where the user operation is input on the display, into coordinate information (5, 40) based on the area 40.

Specifically, the processor 240 may convert the coordinate information of the area 40 relative to the display 210, that is, (10, 20) to (40, 70), into the coordinate information relative to the area 40, that is, (0, 0) to (30, 50). Accordingly, the processor 240 may convert the coordinate information (15, 60) relative to the display 210 of the point into the coordinate information (5, 40) relative to the area 40.

Next, the processor 240 may transmit the converted coordinate information to the dongle 100 through the interface 220. The processor 240 may transmit size information of the area 40 where the application is displayed to the dongle 100 and the converted coordinate information.

As described above, an example of a reason for transmitting the coordinate information by converting it is because when coordinate information based on the display 210 is transmitted to the dongle 100 as it is, the dongle 100 may not specify a location where a user operation is input from the execution image of the application.

Therefore, as described above, when converting the coordinate information of the point where the user operation is input into coordinate information based on the area 40 of the display 210 where the execution image of the application is displayed, and transmitting the converted coordinate information to the dongle 100 and size information of the area 40, the dongle 100 may accurately identify where the user operation is input in which area of the execution image of the application based on the received coordinate information and the size information of the one area 40.

Accordingly, the dongle 100 may identify the user operation with respect to the application and perform an operation corresponding to the user operation. For example, when the user operation is a selection operation of a control UI element included in the execution image of the application, the dongle 100 may perform a control operation corresponding to the control UI element with respect to the application, and when the user operation is a scrolling operation, the dongle 100 may scroll the execution image of the application.

Accordingly, when the execution image of the application in which the operation corresponding to the user operation is performed is received from the dongle 100 through the interface 220, the processor 240 may display the execution image on the display 210.

According to an embodiment, the processor 240 may divide a screen of the display 210 and display an execution screen of the application received from the dongle 100 in an area. At the same time, the processor 240 may display the execution screen of the application of the display apparatus 200 in the other area. An example of this is illustrated in FIG. 5.

Figure 5:
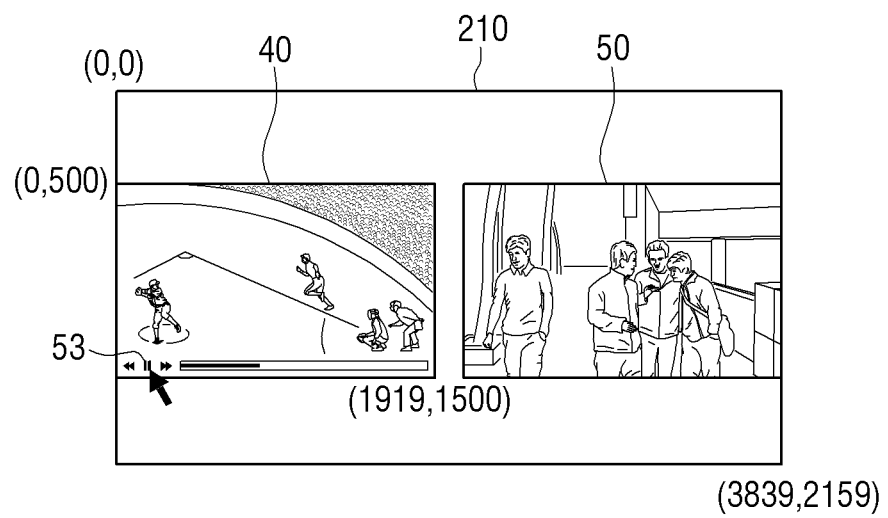
FIG. 5 is a view illustrating a screen provided by a display apparatus to which a dongle is connected according to an embodiment.

Specifically, FIG. 5 is a view illustrating a 4K screen provided by the display apparatus 200 to which the dongle 100 is coupled according to an embodiment.

For example, when the user executes the application of the dongle 100 and the application of the display apparatus 200, respectively, as illustrated in FIG. 5, the execution image of the application of the dongle 100 may be displayed on an area 40 of the display 210 having coordinates bounded by (0, 500) to (1919, 1500), and at the same time, the execution image of the application based on the OS included in the display apparatus 200 is displayed on an area 50 of the display 210.

When a user operation for the application of the dongle 100 is input in a location illustrated as point 53 within the area 40 where the execution image of the application of the dongle 100 is displayed, the processor 240 may convert coordinate information of the point 53 where the user operation is input into coordinate information or relative to the area 40, and transmit the converted coordinate information and size information of the area 40 to the dongle 100, as described above.

FIG. 5 illustrates an embodiment in which the application of the dongle 100 is a sports broadcasting application, and the sports broadcasting image which has been broadcasted is being paused according to a user selection operation with respect to a control UI element corresponding to "pause" while the sports broadcasting image is displayed on an area 40 of the display 210.

Figure 6:
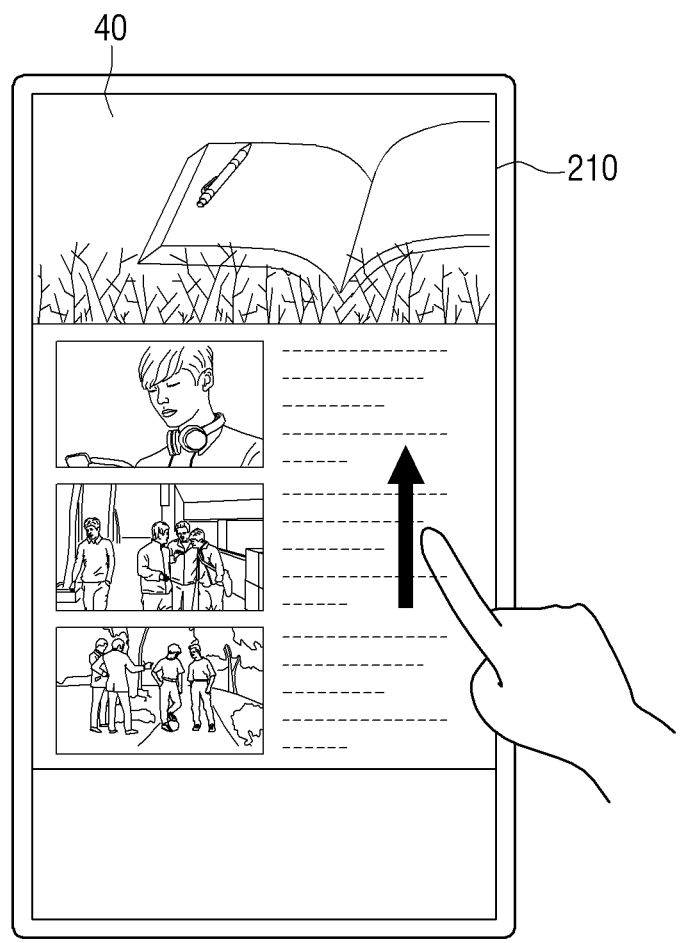
FIG. 6 is a view illustrating a screen provided by a display apparatus to which a dongle is connected according to an embodiment.

FIG. 6 is a view illustrating a screen provided by the display apparatus 200 to which the dongle 100 is coupled according to an embodiment. As described above, while the execution image of the application of the dongle 100 is being displayed on an area 40 of the display 210, the user may scroll the application execution image of the dongle 100 within the area 40.

In embodiments, the processor 240 may convert coordinate information of a point where the user's scrolling operation is input based on or relative to the display 210, into coordinate information based on or relative to the area 40, and transmit the converted coordinate information and size information of the area 40 to the dongle 100. Accordingly, the dongle 100 may scroll the application execution image and transmit the scrolled execution image to the display apparatus 200, and the processor 240 may display the scrolled execution image to the display 210.

Figure 7:
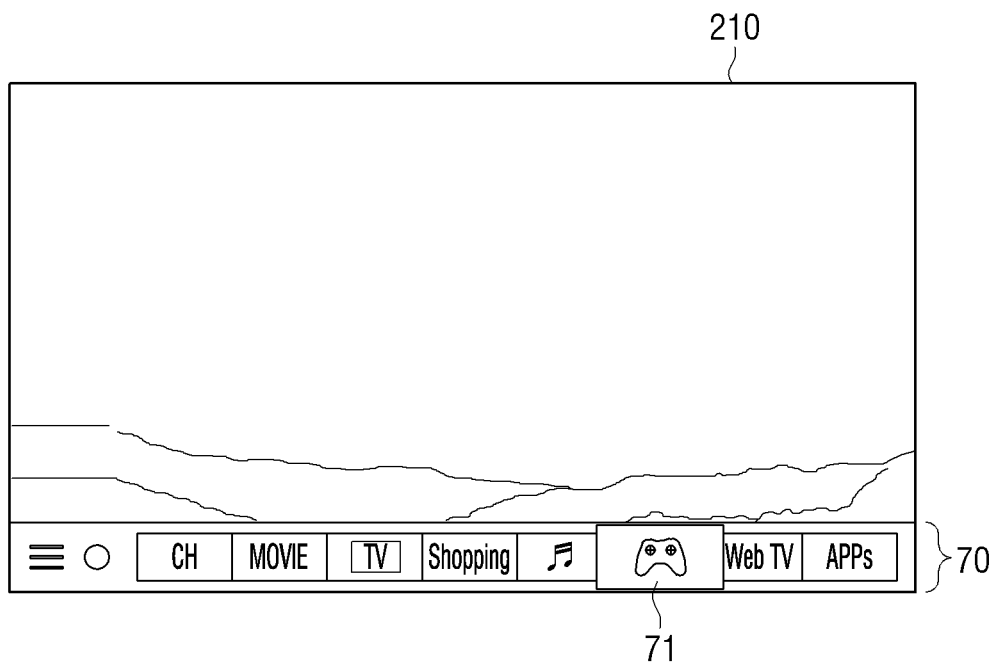
FIG. 7 is a view illustrating a screen provided by a display apparatus to which a dongle is connected according to an embodiment.

FIG. 7 is a view illustrating a screen provided by the display apparatus 200 to which the dongle 100 is coupled according to another embodiment.

As shown in FIG. 7, GUI 70 may include GUIs representing an application of the dongle 100 and GUIs representing applications of the display apparatus 200.

Specifically, when information on the application based on the OS stored in the dongle 100 is received through the interface 110, the processor 240 may display the GUI 71 representing the application of the dongle 100 based on the received information together with the GUI representing the application of the display apparatus 200 on the display 210.

The information related to the application based on the OS stored in the dongle 100 may include a name or a serial number of the application, a URL address of a server managing the application, or the like. Thus, for example, when information on a game application is received from the dongle 100 through the interface 220, the processor 240 may identify the GUI 71 representing a pre-stored game application and display the GUI 71 and GUIs representing the application of the display apparatus 200.

Further, according to an embodiment, the processor 240 may request and receive GUI 71 from a server that manages the corresponding game application through a communicator, and display the received GUI 71 and GUIs representing the application of the display apparatus 200.

When a user input for selecting the GUI 71 representing the game application is received through the user input unit 230, the processor 240 may transmit a signal requesting execution of the game application to the dongle 100 through the interface 220.

Accordingly, when the dongle 100 executes the game application and the execution image is received through the interface 220, the processor 240 may display the execution image of the received game application on one area of the display 210.

Figure 8:
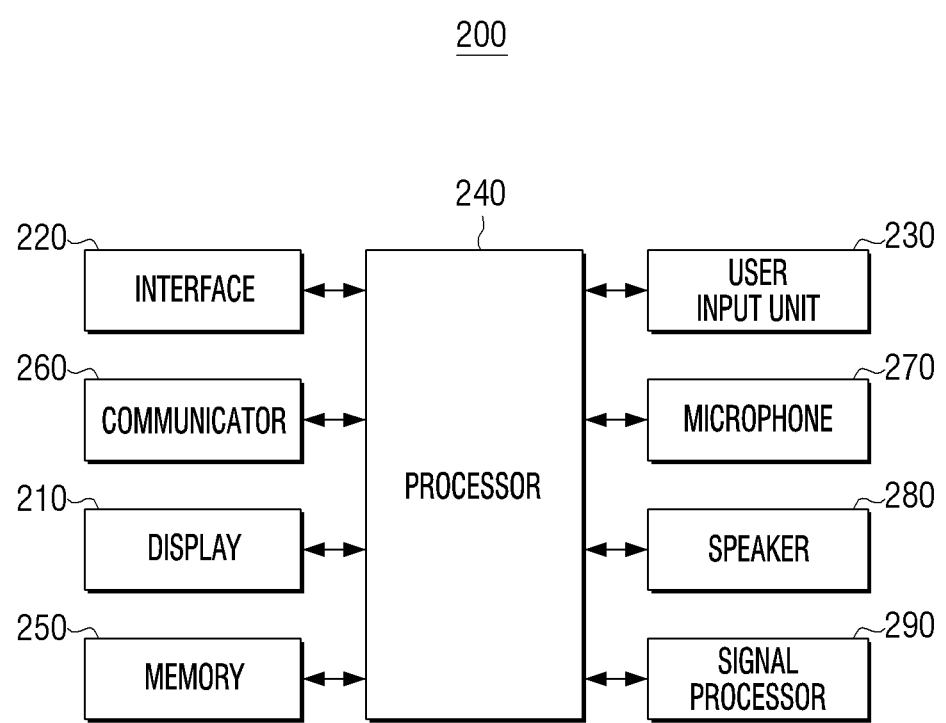
FIG. 8 is a block diagram of a display apparatus according to another embodiment.

FIG. 8 is a block diagram illustrating a structure of a display apparatus according to another embodiment. In describing FIG. 8, some duplicate descriptions of configurations of the display apparatus 200 identical to the above have been omitted Referring to FIG. 8, the display apparatus 200 may include the display 210, the interface 220, the user input unit 230, the processor 240, the memory 250, the communicator 260, a microphone 270, a speaker 280, and a signal processor 290.

The communicator 260 may transmit and receive various data by communicating with an external device. For example, the communicator 260 may perform communication with not only various servers described above through a local area network (LAN), an Internet network, and a mobile communication network, and also perform communication with external electronic devices through various near-field communication methods such as Bluetooth (BT), Bluetooth Low Energy (BLE), Wireless Fidelity (WI-FI,) Zigbee, NFC or the like.

The communicator 260 may perform communication with an external device to receive a broadcast content (or a broadcast signal). The broadcast content may include at least one of image, audio, or additional data (e.g., EPG). For this operation, the communicator 260 may include a tuner, a demodulator, an equalizer, or the like.

The memory 250 may store an OS for controlling the overall operation of components of the display apparatus 200, various programs or applications based on the OS, and various commands or data related to the components of the display apparatus 200.

Accordingly, the processor 240 may read the OS stored in the memory 250, various programs or applications, and data to perform an operation of the display apparatus 200 according to various embodiments.

For this operation, the memory 250 may include internal memory or external memory. The internal memory may include at least one of volatile memory and non-volatile memory. The volatile memory may be dynamic RAM (DRAM), static RAM (SRAM), synchronous dynamic RAM (SDRAM), or the like. The non-volatile memory may be one time programmable ROM (OTPROM), programmable ROM (PROM), erasable and programmable ROM (EPROM), electrically erasable and programmable ROM (EPMROM), mask ROM, flash ROM, NAN flash memory, NOR flash memory, or the like. Also, the internal memory may be a solid state drive (SSD). The external memory may include at least one of compact clash (CF), secure digital (SD), micro secure digital (micro-SD), mini secure digital (mini-SD), extreme digital (xD), memory stick, or the like. The external memory 234 may be functionally or physically coupled to the display apparatus 200 through various interfaces. Also, the display apparatus 200 may further include a storage device such as a hard drive.

The user input unit 230 may receive various commands from a user. The processor 240 may perform a function corresponding to the user command input through the user input unit 230.

For example, the user input unit 230 may receive a user operation for displaying a GUI representing an application of the dongle 100 and an application of the display apparatus 200 on the display 210. Also, the user input unit 230 may receive the user command with respect to the application of the dongle 100 displayed on one area of the display 210.

The user input unit 230 may receive a user operation for executing an application stored in the memory 250. Also, the user input unit 230 may receive a user operation for rotating the display 210. And the user input unit 230 may receive a user operation for perform operations of turning on/turning off, switching channels, controlling volume, or the like, and the processor 240 may turn on the display apparatus 200, switch channels, control volume, or the like according to the input user operation.

The microphone 270 may receive a user voice. The user voice may be a voice for executing a specific function of the display apparatus 200. When the user voice is received through the microphone 270, the processor 240 may recognize the user voice through a voice recognition algorithm such as auto speech recognition (ASR) or natural language understanding (NLU), and perform a function corresponding to the user voice.

For example, when the user voice for executing the application stored in the dongle 100 is received through the microphone 270, the processor 240 may transmit a signal requesting an execution of the application to the dongle 100.

The speaker 280 may output various audios. For example, the speaker 280 may output audio related to the application of the dongle 100 or audio related to the application of the display apparatus 200.

The signal processor 290 may perform signal processing with respect to a content received through the communicator 260. More specifically, the signal processor 290 may perform decoding, scaling, frame rate conversion, or the like, and may perform signal processing on the image in the form capable of outputting from the display apparatus 200.

Further, the signal processor 290 may convert the audio signal included in the content into a form that can be outputted at the speaker 280 by performing signal processing such as decoding. The controller 310 may output the received audio through the speaker. As such, the processed image may be output through the display 210.

In addition, the signal processor 290 may perform signal processing, such as decoding, on audio constituting the content, and process the audio in a form that can be output from the speaker 280. The audio processed as described above may be output through the speaker 280.

Figure 9:
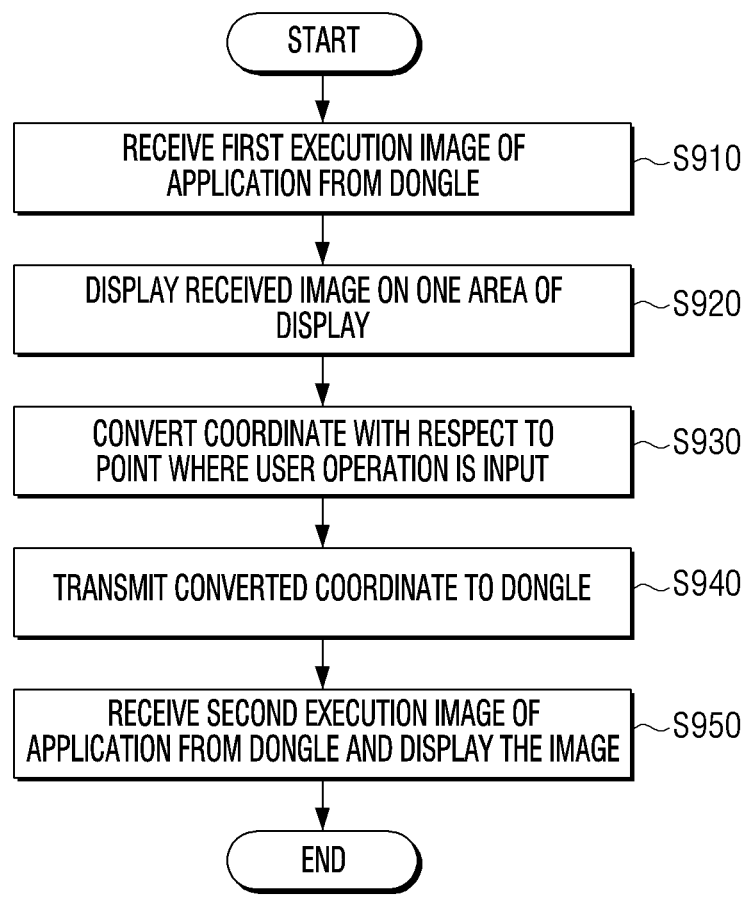
FIG. 9 is a flowchart illustrating a control method of a display apparatus according to an embodiment.

FIG. 9 is a flowchart illustrating a control method of the display apparatus according to an embodiment. Referring to FIG. 9, the display apparatus 200 may receive, from a dongle in which an OS is installed, a first execution image of an application based on the OS installed in the dongle (S910). Here, the OS installed in the dongle may be different from the OS installed in the display apparatus.

According to an embodiment, the display apparatus 200 may receive information about the application of the OS installed in the dongle 100, and display a first GUI representing an application of the OS installed in the dongle 100 based on the received information together with a second GUI representing an application of the OS installed in the display apparatus 200. Accordingly, when a user input for selecting the first GUI is received, the display apparatus 200 may transmit a signal requesting execution of the application of the OS installed in the dongle 100 to the dongle 100, and receive the first execution image from the dongle 100 as the dongle 100 executes the application of the OS installed in the dongle 100 based on the requesting signal.

Accordingly, the display apparatus 200 may display the received first execution image on an area of the display 210 (S920).

When a user operation with respect to the application is input within the area, the display apparatus 200 may convert coordinate information about a point where the user operation is input based on or relative to the display 210 into coordinate information based on or relative to the one area (S930), and transmit the converted coordinate information to the dongle 100 (S940).

The user operation may include at least one of a selection operation and a scrolling operation of the control UI element included in the first execution image. In addition, the display apparatus 200 may include a coordinate-based input device, and user operation may be input through the coordinate-based input device.

The display apparatus 200 may convert coordinate information with respect to a point where the user operation is input into coordinate information based on the area, on the basis of coordinate information with respect to the one area based on the display 210.

Also, the display apparatus 200 may transmit the converted coordinate information and size information of the area to the dongle 100, and the dongle 100 may identify the user operation with respect to the application based on the size information of the area and the converted coordinate information received from the display apparatus 200.

The display apparatus 200 and the dongle 100 may be coupled to each other through an HDMI terminal, and the display apparatus 200 may transmit the converted coordinate information to the dongle 100 through an HDMI-CEC link.

Accordingly, when the second execution image of the application on which an operation corresponding to the user operation is performed is received from the dongle 100 based on the converted coordinate information, the display apparatus 200 may display the received second execution image on the display 210 at operation S950.

While the first execution image is being displayed on the area, the display apparatus 200 may display an execution image of an application of an OS installed in the display apparatus 200 on another area different from the one area.

According to various embodiments as described above, the display apparatus may provide a service provided by an application based on an OS other than the application based on the OS of the display apparatus. In addition, the display apparatus may allow the user to simultaneously receive various services by providing a plurality of services provided by a plurality of applications based on different operating systems on one screen. In addition, when an application based on the other OS different from the OS included in the display apparatus is displayed on the display apparatus, the display apparatus may accurately control the operation of the other OS-based application.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions.

When the instructions are executed by a processor, the processor may perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

Further, each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

Although example embodiments have been illustrated and described, it should be understood that the disclosure is not limited to the disclosed embodiments and may be variously changed without departing from the spirit and the scope of the disclosure. In addition, the embodiments according to the disclosure are not intended to limit technical spirit of the disclosure, but to describe, and the scope of the technical spirit of the disclosure is not limited by these embodiments. Therefore, the scope of the disclosure to be protected should be interpreted by the following claims, and all technical spirits within the equivalent scope should be interpreted as being included in the scope of the disclosure.

What is claimed is:

1. A display apparatus comprising:
a display;
an interface configured to couple with a dongle in which a first operating system (OS) is installed, the first OS being different from a second OS installed in the display apparatus;
a user input device; and
at least one processor configured to:
based on a first execution image of a first application based on the first OS being received from the dongle through the interface, control the display to display the received first execution image on a first area of the display,
based on a user operation at a point within the first area being input through the user input device, convert first coordinate information representing a location of the point relative to the display into second coordinate information representing the location of the point relative to the first area, and control the interface to transmit the second coordinate information to the dongle through the interface, and
based on a second execution image of the first application being received from the dongle through the interface, control the display to display the second execution image on the display, wherein the second execution image is generated by the dongle based on the second coordinate information.

2. The display apparatus of claim 1, wherein the user operation includes at least one from among a selection operation of a control user interface (UI) element included in the first execution image, and a scrolling operation of the control UI element.

3. The display apparatus of claim 1, wherein the at least one processor is further configured to convert the first coordinate information into the second coordinate information based on third coordinate information representing a location of the first area relative to the display.

4. The display apparatus of claim 1, wherein the at least one processor is further configured to transmit the second coordinate information and size information of the first area to the dongle through the interface, and
wherein the dongle is configured to identify the user operation with respect to the first application based on the size information of the first area and the second coordinate information.

5. The display apparatus of claim 1, wherein the user input device includes a coordinate-based input device.

6. The display apparatus of claim 1, wherein the interface includes a high definition multimedia interface (HDMI), and
wherein the at least one processor is further configured to transmit the second coordinate information to the dongle through a consumer electronics control (CEC) link of the HDMI.

7. The display apparatus of claim 1, wherein the at least one processor is further configured to display a third execution image of a second application based on the second OS on a second area different from the first area while the first execution image is displayed on the first area.

8. The display apparatus of claim 1, wherein the at least one processor is further configured to, based on information about the first application being received through the interface, display a first graphical user interface (GUI) representing the first application on the display together with a second GUI representing a second application based on the second OS,
based on receiving a user operation for selecting the first GUI through the user input device, transmit a signal requesting an execution of the first application to the dongle through the interface, and
based on the first execution image being received through the interface as the dongle executes the first application according to the signal, display the received first execution image on the first area of the display.

9. A control method of a display apparatus, the method comprising:
receiving, from a dongle in which a first OS is installed, a first execution image of a first application based on the first OS, the first OS being different from a second OS installed in the display apparatus;
displaying the received first execution image on a first area of a display of the display apparatus;
based on receiving a user operation at a point within the first area, converting first coordinate information representing a location of the point relative to the display into second coordinate information representing the location of the point relative to the first area;
transmitting the second coordinate information to the dongle; and
based on receiving a second execution image of the first application from the dongle, displaying the second execution image on the display, wherein the second execution image is generated by the dongle based on the second coordinate information.

10. The method of claim 9, wherein the user operation includes at least one from among a selection operation of a control user interface (UI), and a scrolling operation of the control UI element.

11. The method of claim 9, wherein the first coordinate information is converted into the second coordinate information based on third coordinate information representing a location of the first area relative to the display.

12. The method of claim 9, further comprising transmitting the second coordinate information and size information of the first area to the dongle,
wherein the dongle is configured to identify the user operation with respect to the first application based on the size information of the first area and the second coordinate information.

13. The method of claim 9, wherein the display apparatus includes a coordinate-based input device, and
wherein the user operation is input through the coordinate-based input device.

14. The method of claim 9, wherein the display apparatus is coupled to the dongle through a high definition multimedia interface (HDMI) terminal, and
wherein the second coordinate information is transmitted to the dongle through a consumer electronics control (CEC) link of the HDMI.

15. The method of claim 9, further comprising displaying a third execution image of a second application based on the second OS on a second area different from the first area while the first execution image is displayed on the first area.

16. The method of claim 9, further comprising:
receiving information about the first application;
displaying a first graphical user interface (GUI) representing the first application together with a second GUI representing a second application based on the second OS;
based on receiving a user operation for selecting the first GUI, transmitting a signal requesting an execution of the first application to the dongle; and
receiving the first execution image from the dongle as the dongle executes the first application according to the signal.

17. A control method of a display apparatus, the method comprising:
receiving, from a dongle in which a first operating system (OS) is installed, an execution image of an application based on the first OS, the first OS being different from a second OS installed in the display apparatus;
displaying the received first execution image on a first area of a display of the display apparatus;
based on receiving a user command corresponding to a point within the first area, converting first coordinate information of the point in a first coordinate system corresponding to the display into second coordinate information of the point in a second coordinate system corresponding to the first area;
transmitting the second coordinate information to the dongle;
receiving a second execution image generated by the dongle based on the user command and the second coordinate information; and
displaying the second execution image on the display.

18. The display apparatus of claim 1, wherein the display apparatus comprises a television,
wherein the first OS is a portable device OS, and
wherein the second OS is a television OS corresponding to the television.

* * * * *